United States Patent [19]
Markman

[11] Patent Number: 5,962,834
[45] Date of Patent: Oct. 5, 1999

[54] INVENTORY TRACKING AND MANAGEMENT APPARATUS WITH MULTI-FUNCTION ENCODING UNIT

[76] Inventor: Herbert L. Markman, 631 Fairston Dr., Wynnewood, Pa. 19096-2506

[21] Appl. No.: 08/819,677

[22] Filed: Mar. 17, 1997

[51] Int. Cl.$^6$ .................................................. G06F 17/60
[52] U.S. Cl. .......................... 235/385; 235/487; 235/492
[58] Field of Search .................................... 235/385, 384, 235/383, 487, 492, 493

[56] References Cited

U.S. PATENT DOCUMENTS

| | | | |
|---|---|---|---|
| 4,475,481 | 10/1984 | Carroll | 119/51 |
| 4,550,246 | 10/1985 | Markman | 235/385 |
| 4,597,495 | 7/1986 | Knosby | 209/3.3 |
| 4,851,815 | 7/1989 | Enkelmann | 340/571 |
| 4,885,571 | 12/1989 | Pauley et al. | 340/573 |
| 4,918,432 | 4/1990 | Pauley et al. | 340/573 |
| 4,952,913 | 8/1990 | Pauley et al. | 340/573 |
| 4,962,369 | 10/1990 | Close | 340/572 |
| 5,001,460 | 3/1991 | Basson | 340/571 |
| 5,081,445 | 1/1992 | Gill et al. | 340/572 |
| 5,204,681 | 4/1993 | Greene | 342/51 |
| 5,218,189 | 6/1993 | Hutchison | 235/439 |
| 5,313,052 | 5/1994 | Watanabe et al. | 235/384 |
| 5,367,289 | 11/1994 | Baro et al. | 340/566 |
| 5,420,757 | 5/1995 | Eberhardt et al. | 361/813 |
| 5,444,223 | 8/1995 | Blama | 235/435 |
| 5,497,140 | 3/1996 | Tuttle | 342/51 |
| 5,517,194 | 5/1996 | Carroll et al. | 342/50 |

FOREIGN PATENT DOCUMENTS

0440306 8/1991 European Pat. Off. .

*Primary Examiner*—F. L. Evans
*Attorney, Agent, or Firm*—Duane, Morris & Heckscher LLP

[57] ABSTRACT

An inventory tracking and management apparatus especially for drycleaning inventory control includes a flexible substrate such as a packet or sheet which houses an RF encoding device for automatic capture of an identifying code, and an optical encoding pattern or series of alphanumeric characters on an exposed surface. The RF encoding element can be captive within a flexible fabric packet that can survive repeated processing, or sewn into a hem of a single thickness sheet, etc. The optical pattern or characters preferably includes barcode for automatic or semiautomatic data capture as well as human readable characters, in each case cross referenced to the identifying code from the RF element and to inventory control records in a database. The packet has one or more openings, preferably defined by a grommet or open centered snap, which receive a fastener for temporary attachment to a trackable unit of inventory including one or more items, e.g., garments. The fastener can include a pin or plastic anchor, or the grommet can allow the packet to be placed over a coat hanger hook to reside in repeatable position on the hanger neck.

18 Claims, 4 Drawing Sheets

INVENTORY TRACKING AND MANAGEMENT APPARATUS WITH MULTI-FUNCTION ENCODING UNIT

BACKGROUND OF THE INVENTION

1. Field of the Invention

The invention relates to inventory control using encoded temporary identification devices for managing an inventory of trackable units of one or more items via automatic data capture, especially garments or groups of garments in a laundry or drycleaning establishment.

A self contained inventory encoding unit is provided in a packet, for example comprising a fabric that is apt to survive repeated passes through processing and has at least one attachment structure. The packet is removably attachable to a garment, garment hanger, packaging for one or more items, or other similar trackable units, for managing movement of the associated item or items through one or more processing steps. The encoding unit preferably has a radio frequency responsive encoding element embedded in the packet, an optically readable identification tag such as a barcode on the surface of the packet, and can have human-readable encoding features such as an alphanumeric code. The packet carries codes that uniquely distinguish the packet from all others concurrently in use. Groups of packets forming distinct lots or the like can also have a distinct color, shape, word, symbol, etc., to associate them together in a non-unique manner, while distinguishing the group from other groups.

The data memory of the inventory control computer stores and correlates the respective codes for each tag with inventory control information concerning the trackable unit, such as its location, status, contents or the like. By sensing or entering the codes, information on the trackable units can be accessed in memory, namely to input, update and read out information. A unique encoding unit or packet is temporarily associated with each trackable unit in the computerized inventory control system, and is activated including by entering or sensing at least one such form of unique code. The code references or addresses the inventory control data on the trackable unit until the process is completed and the packet is removed, recovered for re-use and deactivated in the inventory control records.

2. Prior Art

The flow of inventory through a wide variety of businesses is routinely managed by tracking items in inventory using automatic data capture devices such as barcode scanners to sense codes on labels affixed to the items. The barcode comprises a series of parallel lines and spaces of different widths, forming a numeric or alphanumeric code which can be read by a scanner. The barcode, which for example can represent an identification code, an article description, a location, a process step or other data, is illuminated using a scanner. A reflectance signal is detected and fed to a receiver which determines the code or number associated with the barcode label for use by an inventory control computer.

The identity codes are stored in a computer memory and are correlated or "indexed" to other data relating to the labelled items. The stored data typically includes a description of the item, its present status or location, and/or may include various data values such as times, counts, summaries and other stored information that the computer adjusts as a function of its programming, when certain events occur and an identification code is scanned. For example with UPC product codes, the barcode represents a product type and the stored data includes a description and a price to be read out when a product code is scanned at a point of sale terminal. UPC codes are unique to a product type rather than unique to a particular item. In other environments unique encoding is used to distinguish a particular trackable item or set of items from all others.

A paper label or document can be affixed to the trackable item to carry its barcode, and potentially related barcodes as well as print information. For example, a package containing a number of items being sent to a customer from a warehouse inventory could have an adhesively affixed label bearing a barcode identifying the order, a number of barcodes identifying the items, and a shipping address for the customer. When the items are packed, the item barcodes are scanned for automatically decrementing the count of items in inventory, and for noting their change in location from inventory to shipping. Shelf locations can be barcoded as well, enabling the inventory records to be corrected as to the contents of particular shelves. When the package is completed and shipped, the barcode identifying the order is scanned to note passage of the package out the door. These and many other inventory control functions are available.

In general, barcodes provide an improvement over manual data entry in that scanning of barcodes is much more accurate than entering the same amount of data by manual keystrokes. Although a manual key entry may typically be erroneous one keystroke in 50, it has been reported that Code 39 barcode errors occur on the order of one in three million scans, each comprising a number of characters.

One drawback of barcoding is that the affixed barcode label must be in a position that is intersected by the optical scanning device or its data will not be found. Scanners are known that pass an illuminating beam repetitively through a range of positions and scanning angles. However, even those scanners cannot deal with a barcode label that is occluded, for example being located on a different wall of a carton or being provided on a loosely affixed label that happens to be turned backside out. For these reasons, labels that must be scanned automatically (as opposed to with a hand scanner) are typically affixed adhesively, and care is taken as to the position of the label on the package as well as the orientation of the package in transport.

In connection with laundry and drycleaning, it is known to heat seal a barcoded label into garments such as the collars of shirts to provide a serial number that can be scanned to identify the garment, the customer who presented the garment for cleaning, or a particular customer order (i.e., a transaction having one or several associated articles to be accepted, cleaned and returned to the customer in a group). The barcode is permanently attached and can be scanned before or after cleaning operations. If the barcode identifies the garment rather than the order, it is available for use if the garment is presented in a later transaction or order. However, barcodes affixed to garments are not always automatically scannable, and often must be found and scanned manually.

Similarly, in U.S. Pat. No. Re.33,054—Markman, the disclosure of which is hereby incorporated, an order ticket having a barcode that is unique to the customer order is generated by the inventory control computer of a drycleaning operation or other establishment when descriptions of the garment(s) in the order are entered and printed on the ticket. The order ticket is merely paper and is not designed to survive a cleaning operation. The ticket is separated from the garments to which it refers, and attached to the finished order after the garments are assembled together into their original group.

Barcodes can be accompanied by information presented in another form. Barcodes are often printed together with human readable characters that represent the data contained in the barcode. In that case if a barcoded label cannot be scanned for whatever reason, it is possible for an attendant to manually enter the identification information for the barcode label. For example, the barcoded label of a grocery item may be ripped or smudged, making the barcode difficult to scan automatically. To obtain the price of the item from the inventory control system, the attendant can manually enter the code into the point of sale terminal, but this risks keystroke errors.

The accuracy and convenience of barcode data entry and its ability to trigger programmed operation of the inventory control computer all revolve around scanning of the barcode. Thus, the barcode must be undamaged, exposed and presented to the scanner in the proper position and orientation. Sometimes this is a problem. Another known way in which a data code can be automatically captured, which does not rely on presentation of an optical code, involves the attachment of radio frequency (RF) responders. Each responder has a unique response to irradiation by RF energy. For example the responder may reflect resonantly only at particular frequencies (e.g., as in U.S. Pat. Nos. 5,218,189—Hutchinson and 5,204,681—Greene) or may reflect with particular phase shifts relative to incident RF fields in a parallel or serial manner. The different responses of different encoded responders can form identification codes for inventory items and the like, in the same binary manner as with barcode. The responders can be made quite small, e.g., small enough for mounting in a personal identification card, and can be potted or encapsulated as in U.S. Pat. No. 5,420,757—Eberhardt et al., such that they can survive washing when sewn into the seam of a garment, towel or the like. The disclosures of the foregoing patents are also hereby incorporated.

RF responders normally require proximity to the source of RF radiation and the detector responsive to reflected energy, but do not rely upon orientation or exposure, as does visual scanning. The proximity requirement is in fact helpful because the RF illumination and detection device generally interacts only with one nearby RF tag in the case where trackable units are passing by sequentially one after another. Additional examples of radio frequency responders embedded in tags include U.S. Pat. No. 5,444,223—Blama and 4,851,815—Enkelmann, the disclosures of which are also incorporated herein for their teachings of electronic identification systems using RF responsive chips that under irradiation emit a signal that is translated into a digital signal used as a code to identify the particular tag and hence a particular item of inventory.

An RF irradiation/detection device used in a tracking station arranged to detect the passage of encoded items may have a typical range of 18 inches (45 cm). This presents a challenge with respect to garments, which typically have dimensions greater than that. If an RF tag is sewn into a seam in a remote part of a garment, there is a possibility that it may pass through the tracking station without being detected. Another drawback is that RF responders are more expensive than barcode labels. RF encoding may be impractically expensive in a situation in which every inventory item needs an RF tag sewn into it for tracking, but the tags go out of action whenever the items are returned to the custody of the customers. Sewing in RF encoding tags also may be impractical for many of the common drycleaning operations in which customers are irregular and/or many garments are presented for the first time. The operator would need to check each incoming garment for an RF tag and add tags to those that lack them. Whereas the tags are often encapsulated in glass, the operator may also need to constantly check incoming tagged garments as to whether the tags are intact.

One solution is to provide an RF tag that is only temporarily attached to the item. Thus the tag is removable from the item before the item leaves the premises and can be reused to identify a different item later. European Pat. No. 440306—Kroezen, discloses a reusable-tag RF tracking system for use in a laundry. Kroezen teaches attaching an RF chip encapsulated between facing covers forming a waterproof enclosure with a central hole. A fastener extends through the enclosure and pierces the fabric of a garment, for example through a shirt collar, before the garment is washed or drycleaned. A colored strip can be attached at the same time, to associate the garment with a particular lot. Kroezen removes the tag for reuse after washing is complete.

Kroezen relies only on the RF tag to provide an encoded identification means. If an RF tag is outside of reading range or becomes damaged and unreadable, or if the RF tag scanning equipment malfunctions, there is no backup way to remedy the fact. Neither the garment nor the tag exhibits any means by which the garment can be identified, except perhaps from the garment descriptions originally entered into the inventory records, which are typically quite terse (e.g., shirt/white, etc.). It will be necessary somehow to identify the garment to associate it with the customer order and to update the data in the inventory tracking system. This places the operator at the mercy of the RF tag reader and the RF tags. The business cannot operate as a practical matter until repairs are effected.

Garments bearing damaged tags can become undocumented phantom garments that are a problem for an operator processing many garments from many customers. Nothing about the garment or tag that shows that it is unreadable. No optical scanning or human readable code is provided to remedy unsuccessful attempts to read the RF tag or later identify the garment or correct the inventory records. If the inventory item cannot be identified a customer's order may be incomplete and the customer lost.

It would be advantageous to provide an inventory tracking and management apparatus which is reusable, which has at least one backup for the RF tags, which optimally packages RF and visual backup code bearing indicia for convenient temporary attachment to a garment or an order or their packaging, preferably without necessarily stapling or piercing the garment, and which is convenient, inexpensive and effective for inventory control.

SUMMARY OF THE INVENTION

It is an object of the invention to provide an inventory tracking and management apparatus in which identification codes for articles such as garments or orders of several garments can be acquired automatically for managing an inventory.

It is a further object of the invention to provide an inventory tracking and management apparatus which is reusable.

It is a further object of the invention to provide an inventory tracking and management apparatus which features both optical (scannable and/or human readable) and RF electronic tracking codes that are cross referenced in computer memory and can be used alternatively when necessary or convenient.

It is a further object of the invention to provide an inventory tracking and management apparatus which employs an RF encoding element embedded in a packet, for example a piece of fabric or a fabric enclosure, structured for removable and re-usable attachment to a trackable unit of inventory such as a garment or garment order.

It is another object to optimize such an encoding packet by including an encapsulated RF tag in a process treatable package having a scannable barcode, human discernable characters, colors, symbols or shapes and structures that facilitate attachment to one or more garments, to hangers or packaging therefor, as well as to other types of articles or article groups.

It is also an object to provide for temporary marking of articles or groups of articles with automatic and manually capturable data, in order to permit automatic or semiautomatic identification as well as manual operability should the identification system or the inventory control computer fail.

These and other objects are accomplished by an inventory tracking and management apparatus comprising a substrate in the form of a flexible sheet or packet carrying optical and RF tracking means. The substrate can be constructed from a fabric which is resistant to the conditions of the environment through which a piece of inventory is to be tracked, for example being capable of surviving repeated cleaning operations. The packet has one or more openings which either receive a fastener, such as a in or plastic fastener, and can be dimensioned to allow the packet to be placed over the hook and twisted neck of a coat hanger. The openings can be heat formed, formed by grommets or snaps and/or serged. The openings allow the packet to be positioned at a particular and repeatable location on a piece of inventory to be tracked.

Other objects, advantages and novel features of the invention will become apparent from the following detailed description of the invention when considered in conjunction with the accompanying drawings.

BRIEF DESCRIPTION OF THE DRAWINGS

The drawings show exemplary embodiments of the invention a presently preferred. It should be understood, however, that this invention is not limited to precise arrangements and instrumentalities shown as examples.

DETAILED DESCRIPTION OF THE PREFERRED EMBODIMENTS

Figure 1:
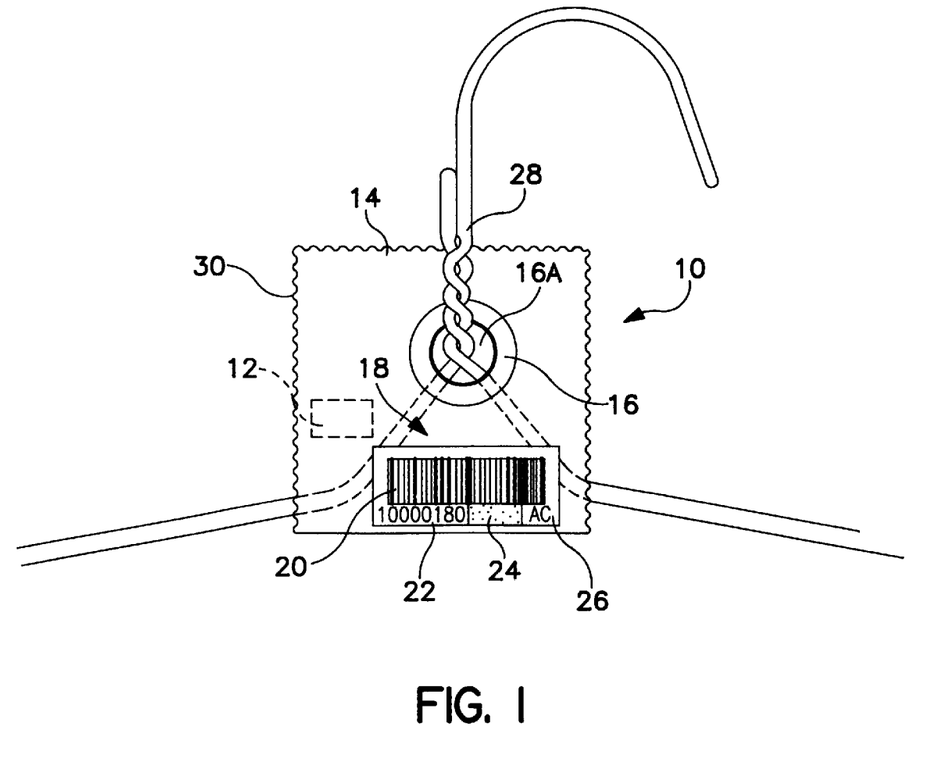
FIG. 1 is a front view of the inventory tracking and management apparatus of the invention shown suspended from a coat hanger.

Referring to the drawings wherein the same reference numbers are used throughout to identify the same elements, there is shown in FIG. 1 an inventory tracking and management apparatus 10 according to the invention. The inventory tracking and management apparatus 10 is utilized in an inventory system which includes a computerized inventory control database and at least one tracking station at which identification codes are automatically captured for articles or groups of articles such as garments, labelled with tracking and management apparatus 10 having a distinct code, for adjusting inventory control records to mark the passage of the articles.

Apparatus 10 is temporarily associated with a customer order or an article contained in a customer order. For example, after garments are received from a customer, apparatus 10 is attached either to a group of articles that will move together, or to each article. The identification code is captured, to activate an inventory control record associated with the code. Information such as the customer identity, descriptions of the articles and the like, is stored in the database and indexed to the code contained in apparatus 10. If desired, the code can be captured at one or more points along a processing path for revising the inventory records to indicate that the articles have passed that point. When an order is complete and is returned to the customer, the identification code can be captured for revising the data to indicate that the transaction is complete. The inventory record associated with apparatus 10 is then deactivated and apparatus 10 is removed and made available for use with a new article or order.

It is desirable that information concerning each trackable unit of inventory is adjusted as the inventory passes through a tracking station. The code is relayed to the computerized tracking unit, which is programmed to maintain a database of information. The information for a given trackable unit is indexed to the code, for example in a numeric sequence or a look-up table. A variety of specific database functions can be maintained in this manner. For example, inventory contents can be monitored by the number and descriptions of trackable articles, totals can be kept for work received or in progress or delivered. The amount of cash that should have been collected or will be collected can be calculated. Separated labelled articles can be re-assembled into their original groups containing plural articles. The location of the articles, at least between scanning stations, can be determined. These and other inventory control functions are permitted.

The RF encoded responder contained in apparatus 10 reads out a particular code such as a number. According to an inventive aspect, each inventory tracking and management apparatus 10 also has optically detectable data associated with it, which can be the same number or can be a different number that is correlated with the RF encoded number in the memory of the inventory control computer. This can comprise automatically capturable data in the form of barcode 20. In addition, apparatus 10 has a human readable individual identification number 22. The identification number 22, barcode 20 and RF encoded data can be equal or can be indexed to one another in memory, and provide alternative means by which an inventory control record is accessed.

According to an inventive aspect, the human and machine readable indicia provide alternative identification possibilities. For example, a business can have RF readers at some locations, barcode scanners at other locations, and can have manual data entry devices at additional locations or for use if the automatic identification elements or the inventory control computer should fail. By employing some of the less-expensive barcode scanners where possible (e.g., where a garment is being handled manually) and a limited number of more-expensive RF readers (e.g., where the garments are not accessible or are being conveyed), costs are minimized.

According to another aspect, some of the digits of the human-readable indicia are made larger than others on packet 14, such as the three least significant digits. These same numbers are printed on order tickets or other paperwork associated with a group of articles such as a customer order. In the event that the inventory control system or the data capture devices should fail, the operator can revert to a manual assembly procedure wherein the larger marking digits are matched with corresponding numbers on a paper form, when re-assembling a customer order or other group of articles after they have been commingled for processing.

Generally, the inventory tracking and management apparatus 10 comprises an optically reflective indicia 18 and a radio frequency (RF) responsive code means 12 for tracking. The RF responsive code means is embedded in a flexible packet 14 and the optically reflective means 18 is placed on the front surface and preferably also the rear surface of packet 14. The RF tracking element can be any responder circuit which provides an individualized or encoded response to a transmitted irradiation signal. The RF encoding element 12 can comprise a glass or plastic encapsulated RF receiver chip, and can be sewn into a seam, or alternatively the fabric portion can form a closed pocket in which element 12 is captive.

In order to be scanned, RF encoding element 12 must be brought within range of an RF transponder operable to irradiate element 12 and detect the responsive code. The transponder for irradiating the encoding element can be disposed, for example, along a conveyor path or in a processing device such as a press, or at a station where a manual operation is undertaken, etc.

If the RF element 12 passes a particular tracking station out of scanning range and is not detected, or if the RF element is damaged and fails to respond with a valid detectable code, the barcode 20 can be scanned, or the numeric data 22 can be entered via keyboard. Although RF tracking means 12 provides no optical or visual means for identifying the particular trackable unit of inventory, and the optical/visual indicia 18 may be occluded, the inventory item always can be associated in one way or another with its inventory control record.

The optical/visual code data 18 can be provided on a tag or patch portion, for example being printed by thermal transfer, and heat sealed or adhesively attached to the temporary marker 10. Also included on the preferred tracking tag 18 are a human-readable alphanumeric code such as identification number 22, a color code 24 and/or alphabetic identifier 26 or the like, that identifies a lot such as a particular group of customer orders. Various lot strategies are possible, such as a lot having a particular number of orders, a lot consisting of all customer orders received or due on a particular day or shift, etc.

The human-readable code 22 can reflect the same information as the barcode, and identifies the particular inventory tracking and management apparatus 10 in the computerized inventory control database, in the manner of a unique serial number. The code is entered into the central tracking unit when apparatus 10 is attached to or associated with an inventory unit to be tracked. Color code 24 and alphabetic code 26 serve to identify a lot with which a particular item of inventory is associated, and these codes as well as other information in the inventory control database are cross referenced to the respective codes as well as other information in the database. The particular information cross referenced to the codes can be customer identification information, status, location and timing information, charges, descriptions of the articles and any other information referring to the trackable unit.

The serial number codes uniquely identify the trackable unit. The color or alphanumeric codes respecting the groups or lots identify the trackable unit as a member of the group, i.e., in a non-unique manner. The group or lot designations are convenient when handling a number of trackable units in a processing step that does not require them to be distinguished uniquely.

As stated above, RF tracking means 12 and visual tracking means 18 are respectively embedded within, and located on the surface of flexible packet 14. Packet 14 is constructed from a material which is resistant to the conditions of the environment through which the piece of inventory is to be tracked. Packet 14 can be constructed, for example, by folding a piece of sheet material in half and connecting its detached ends by means of stitching 30. Before connecting the detached ends of packet 14, RF tracking means 12 is placed within packet 14. Alternatively, the "packet" can consist of a single thickness of material having a hemmed edge, the RF means 12 being rolled into the hem before stitching. Visual identification means 18 can be attached to the front and rear face of packet 14 by stitching, adhesive, heat sealing, printing or the like.

Flexible packet 14 is durable for surviving repeated processing. The packet can be made, for example, from natural fibers such as cotton (canvas) or man-made plastic, or a combination. By using a polyester/cotton blend, it is possible to form the necessary seams, hems and/or openings using a heated tool for bonding fibers at the perimeter of packet 14 or at the edges of a hole. Alternatively, such edges can be overstitched or serged.

According to a preferred embodiment, flexible packet 14 can be attached either directly to a trackable unit of inventory or to a transport medium or package for the trackable unit. As shown in FIG. 1, flexible packet 14 can be attached to a coat hanger 28 on or with which a trackable unit of inventory is transported. Referring also to the embodiments shown in FIGS. 2 and 3, packet 14 can contain at least one, and preferably two apertures 16A, 36A. Aperture 16A is formed by grommet 16 and is of sufficient diameter to pass over the twisted wire end of hanger 28. Once placed on hanger 28, packet 14 remains with the item of inventory until the item is delivered to the customer. In addition, by mounting packet 14 to hanger 28 as shown, the relative position of the packets on each successive trackable unit is the same, enabling reading with an appropriately placed RF tag detector or barcode scanner, and readily found and viewed by human operators.

Figure 2:
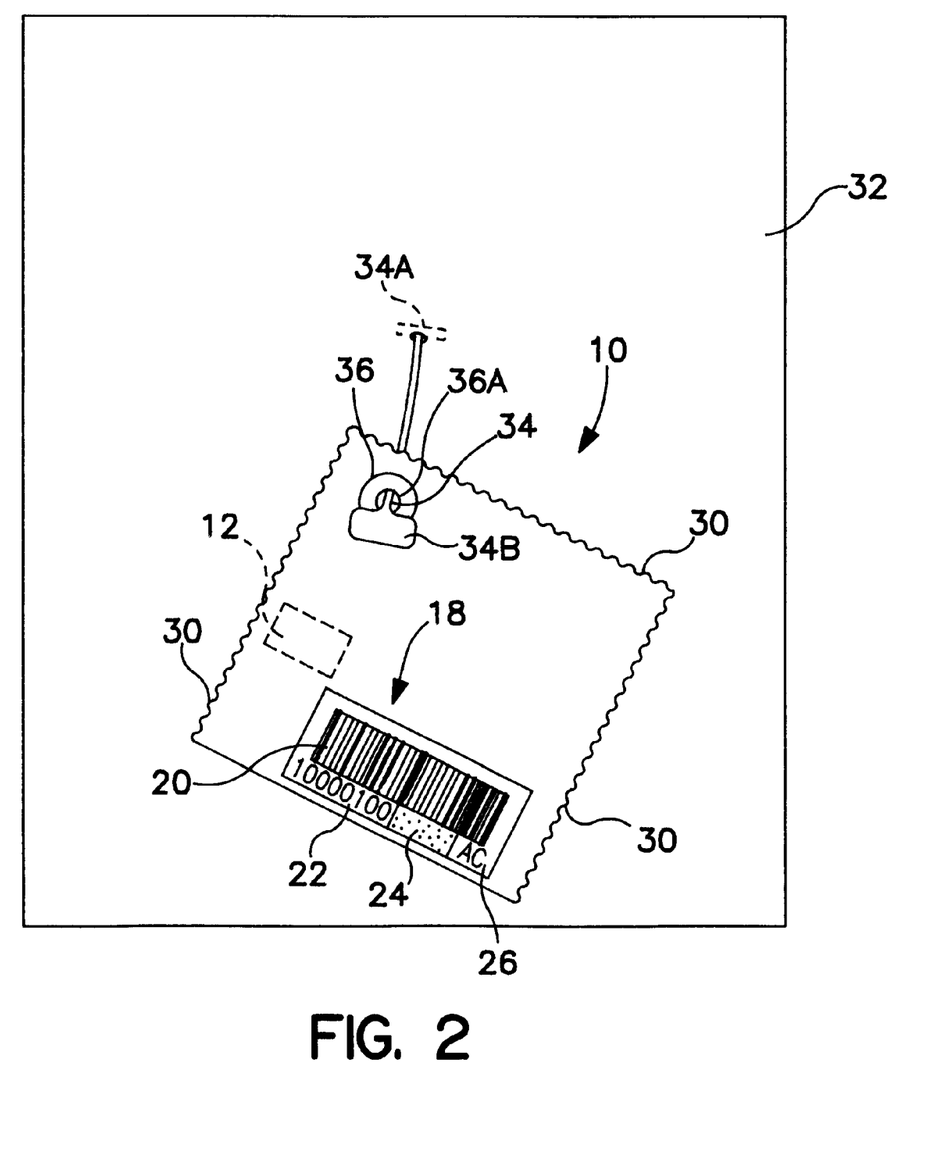
FIG. 2 is another embodiment for the inventory tracking and management apparatus of FIG. 1 shown suspended from an anchor.
Figure 3:
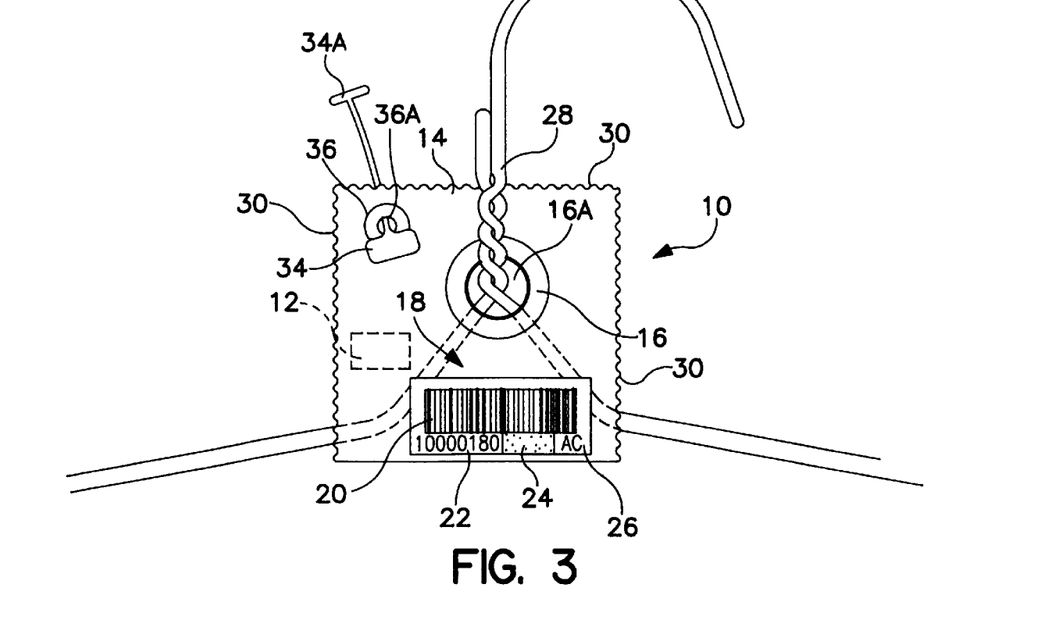
FIG. 3 is another embodiment of the inventory tracking and management apparatus of FIG. 1 showing one aperture receiving a coat hanger and another aperture receiving an anchor.
Figure 4:
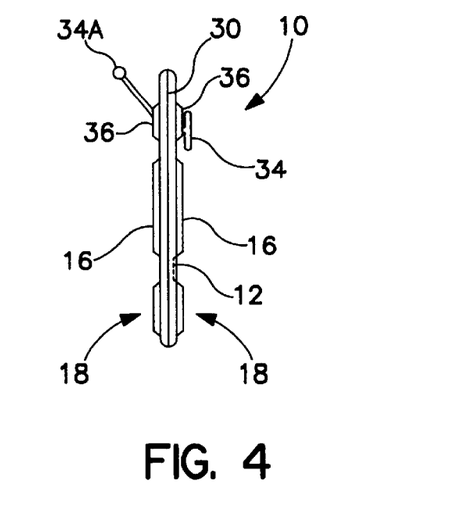
FIG. 4 is a side view of the inventory tracking and management apparatus of FIG. 3 shown suspended from an anchor.
Figure 5:
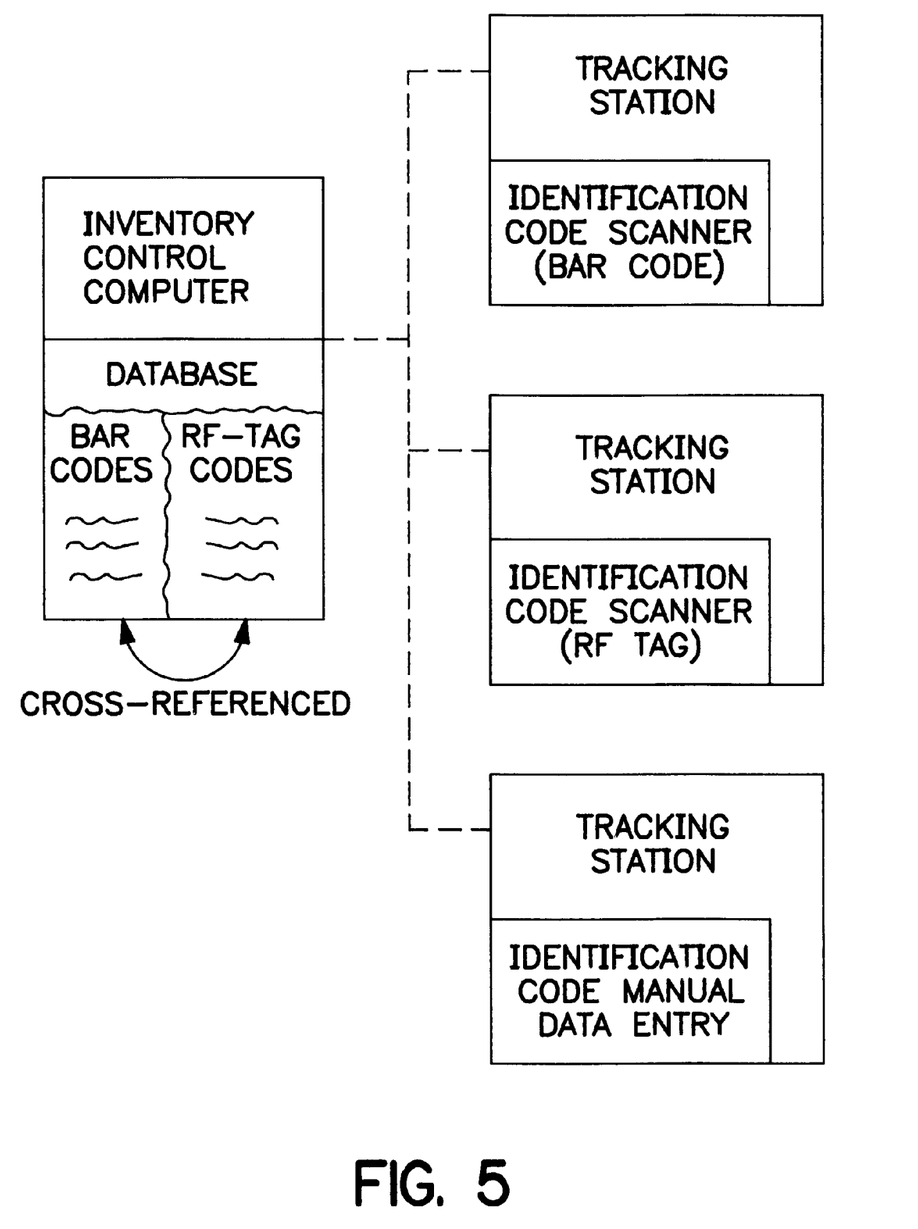
FIG. 5 is a block diagram of an inventory control computer and associated tracking stations in accordance with the invention.

As shown in FIG. 2, packet 14 can be attached directly to the trackable unit of inventory 32 by means of a plastic anchor 34 such as a Dennison anchor which comprises a plastic strip having elongated ends 34A and 34B on opposite surfaces of packet 14 and at least one thickness of fabric of the trackable unit. Elongated end 34A protrudes through inventory item 32 while elongated end 34B is received by aperture 36A. Aperture 36A can be formed by snap 36 of the type having an opening or lumen through which one of the enlarged ends can be passed when attaching the anchor to the trackable unit. As shown it FIG. 3, packet 14 can contain both snap 36 and grommet 16 allowing the user to choose a method for connecting apparatus 10 to an item of inventory to be tracked.

Packet 14 and the encoding contained on and in packet 14 provide temporary and re-usable identifiers for the trackable unit, the contents of the trackable unit and the group to which the trackable unit belongs. The codes are associated with the trackable unit at a particular point in processing, for example shortly after the trackable unit is left off by a customer or alternatively further along in the progress of a transaction involving the dropoff of one or more items in an order, their processing through one or more procedures, and the return or delivery of the same items to the customer. During the time the packet 14 is associated with the trackable unit, it is possible to update information in the inventory control database by entering the codes by automatic data capture devices such as RF or barcode detectors or by manual keystrokes. When the order reaches the end of the processing steps requiring tracking and updating of inventory records, such as when the order is delivered back to the customer, packet 14 is removed. The inventory control records applicable to the codes associated with packet 14 are then deactivated or marked as complete. Packet 14 is then available to be used again on another customer's order by activating a new inventory control record referenced to the codes, as described above.

The invention may be embodied in a variety of specific forms without departing from the spirit or essential attributes thereof. The exemplary embodiments described above are intended as being illustrative rather than restrictive, and the scope of the invention is defined by the appended claims, including such modifications as fall within a range of equivalence which is also embraced therein.

I claim:

1. A reusable inventory tracking and management apparatus, comprising:

a substrate which is resistant to conditions prevailing in a process, the substrate being removably attachable to a trackable unit of inventory having one or more items to be passed through a process and recovered;

means for temporarily attaching said substrate to said trackable unit during passing through the process, said means for attaching being removable following the process for re-use on a later trackable unit of inventory;

a responder encoding an electronic identification code for the substrate and for the trackable unit during passing through the process, said responder being attached permanently to the substrate;

a visual identification tag containing at least one form of optical identification code for identifying said piece of inventory, said visual identification tag being located on an exposed surface of said substrate;

first data input means operable to input the electronic identification code and second data input means operable to input the optical identification code; and, an inventory control computer database coupled to the first and second data input means, having means for cross referencing the electronic identification code and the optical identification code, whereby either of the electronic identification code and the optical identification code are useful for accessing the inventory control database for reference to a record associated with the trackable unit.

2. The inventory management and tracking apparatus of claim 1, wherein the substrate is structured to withstand repeated processing through one of a laundry and drycleaning operation.

3. The inventory management and tracking apparatus of claim 1, wherein said responder comprises an RF responsive encoder and the optical identification code comprises at least one of a scannable barcode and a human readable code.

4. The inventory management and tracking apparatus of claim 1, wherein said substrate comprises a flexible sheet and said means for temporarily attaching said substrate to said trackable unit comprises a first aperture through the sheet, through which a hanging means protrudes.

5. The inventory management and tracking apparatus of claim 4, wherein said first aperture is defined by a first grommet attached to said flexible sheet.

6. The inventory management and tracking apparatus of claim 5, further comprising at least one second aperture in the substrate, through which a hanging means protrudes.

7. The inventory management and tracking apparatus of claim 6, wherein said second aperture is formed by one of a second grommet and a snap attached to said substrate.

8. The inventory management and tracking apparatus of claim 5, wherein said hanging means comprises a coat hanger for carrying at least part of the trackable unit and said grommet is dimensioned to fit on a neck of the coat hanger.

9. The inventory management and tracking apparatus of claim 5, wherein said hanging means comprises a plastic strip having a first elongated end and a second elongated end respectively protruding through one of the substrate and at least one thickness of the trackable unit for attaching the substrate to the trackable unit.

10. The inventory management and tracking apparatus of claim 1, wherein said responder comprises a glass-encapsulated RF receiver.

11. The inventory management and tracking apparatus of claim 1, wherein said visual identification tag includes a bar code which is scannable to identify said trackable unit.

12. The inventory management and tracking apparatus of claim 1, wherein said visual identification tag has a color code and an alphabetic code for identifying a group to which said piece of inventory belongs.

13. An inventory management and tracking apparatus for temporarily encoding trackable units received into an inventory managed using an inventory control database referencing codes uniquely identifying the trackable units, the trackable units to be passed through a process and returned, comprising:

a plurality of reusable encoding tags for identifying the trackable units during the process, each of the tags having means for temporary attachment to the trackable units, at least one electronic encoding device carrying an automatically capturable code by which the tags and their associated trackable units are distinguishable and are referenced to the inventory control database, and at least one optically detectable code providing an alternative means by which the trackable units are distinguished and referenced to the inventory control database;

data input means coupled to the inventory control database and having alternative means for input of the automatically capturable code and the optically detectable code; and wherein the automatically capturable code and the optically detectable code are cross referenced in the inventory control database, whereby either of the electronic identification code and the optical identification code are useful for accessing the inventory control database for reference to a record associated with the traceable unit.

14. The inventory management and tracking apparatus of claim 13, wherein the electronic encoding device comprises an RF responder providing a distinct detectable response to RF irradiation, and the optically detectable code comprises at least one of a scannable barcode and a human readable printed number.

15. The inventory management and tracking apparatus of claim 14, wherein the optically detectable code further comprises at least one indicia for non-uniquely distinguishing groups of the trackable units according to lots.

16. The inventory management and tracking apparatus of claim 14, wherein the means for temporary attachment comprises at least one grommet having an opening by which the tags are attachable temporarily to at least a portion of the trackable units.

17. The inventory management and tracking apparatus of claim 16, wherein the grommet is dimensioned to receive one of a fastener and a coat hanger hook passing through the grommet.

18. The inventory management and tracking apparatus of claim 17, wherein the grommet is dimensioned to fit over a coat hanger hook and reside at a neck of the coat hanger.

\* \* \* \* \*